(No Model.)
W. H. McFADDEN.
GOVERNOR FOR POWER SHAFTS.
No. 574,209. Patented Dec. 29, 1896.
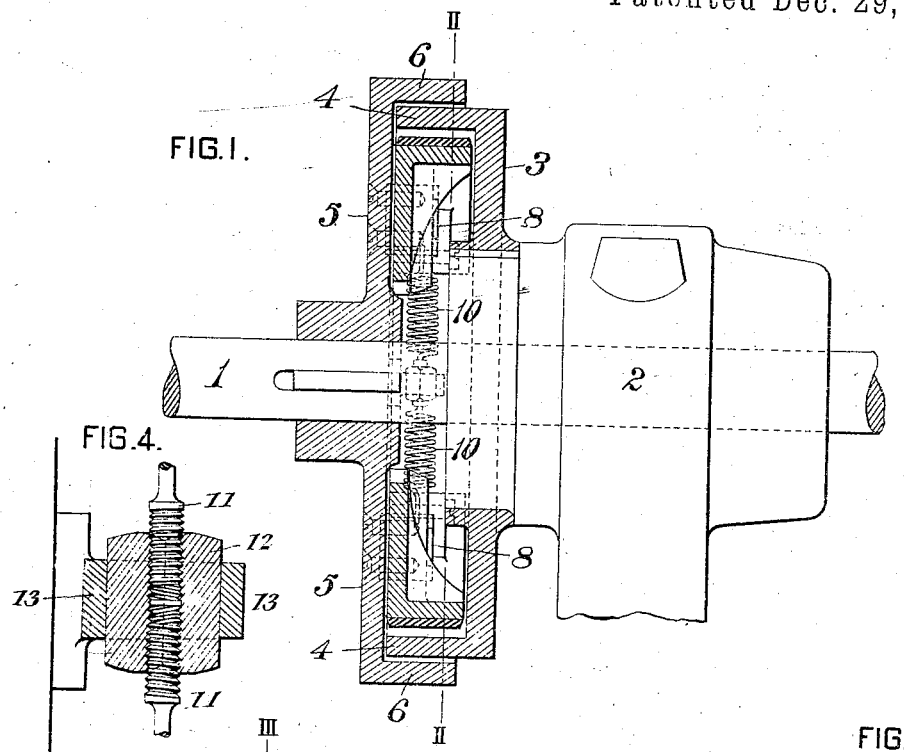
FIG. 1.
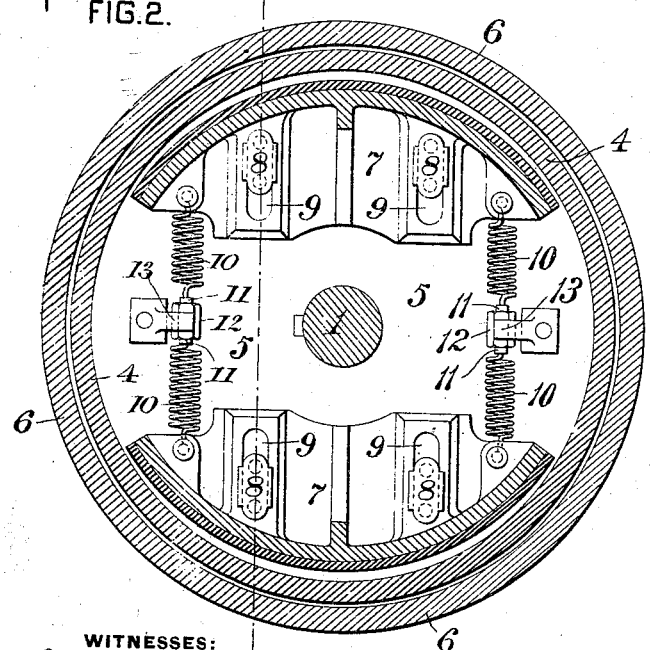
FIG. 4.
FIG. 2.
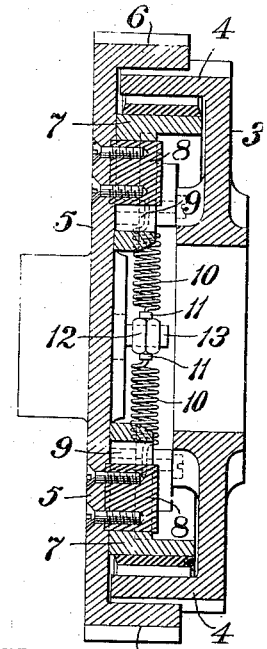
FIG. 3.
WITNESSES:
Chas. F. Miller
N. E. Fairker
INVENTOR,
William H. McFadden
by Danni S. Wolcott
Att'y.

UNITED STATES PATENT OFFICE.

WILLIAM H. McFADDEN, OF ALLEGHENY, PENNSYLVANIA.

GOVERNOR FOR POWER-SHAFTS.

SPECIFICATION forming part of Letters Patent No. 574,209, dated December 29, 1896.

Application filed March 23, 1896. Serial No. 584,403. (No model.)

*To all whom it may concern:*

Be it known that I, WILLIAM H. McFADDEN, a citizen of the United States, residing at Allegheny, in the county of Allegheny and State of Pennsylvania, have invented or discovered a certain new and useful Improvement in Governors for Power-Shafts, of which improvement the following is a specification.

The invention described herein relates to certain improvements in brakes for controlling the rotation of power-shafts, &c., and has for its object the automatic regulation of the forward or reverse speed of the shaft A.

In general terms the invention consists in the construction and combination substantially as hereinafter more fully described and claimed.

In the accompanying drawings, forming a part of this specification, Figure 1 is a view, partly in elevation and partly in section, of a portion of a power-shaft having my improvement applied thereto. Figs. 2 and 3 are sectional views, the planes of section being indicated by the lines II II, Fig. 1, and III III, Fig. 2, respectively. Fig. 4 is a sectional detail view illustrating the means for adjusting the tension of the springs.

The power-shaft 1, to which is attached any suitable motor, (not shown,) is mounted in suitable bearings 2, only one of which is shown. On the bearing 2 is formed or secured a flange 3, provided with a laterally-projecting rim 4, and on the power-shaft 1 is secured a similar disk 5, preferably having a flange 6, which will overlap the rim 4. Such overlapping rim may, however, be omitted. Two or more shoes 7 are movably mounted on blocks 8, which are secured on the inner face of the disk 5. These blocks are arranged in slots 9, formed in the shoes, and are provided with heads which overlap the sides of the slots and thereby hold the shoes in place. The perimeters of the shoes are curved to correspond to the curvature of the inner surface of the rim 4, so as to have a good firm bearing thereon. The shoes are normally held out of contact with the rim 4 by means of springs 10, which are so connected to the shoes as to insure the holding of both shoes with equal force away from the rim.

In order to provide for the adjustment of the tension of the springs, they are made in sections, as shown in Fig. 2, and the inner or adjacent ends are attached to threaded pins 11, which fit within the internally-threaded sleeve 12. The pins 11 are oppositely threaded, and the threads at the ends of the sleeve have opposite pitches. The sleeve is held from accidental rotation by an open-sided clip 13, so arranged that the normal pull of the springs will hold the sleeve in the clip. When it is desired to adjust the tension of the springs, the sleeve is pulled laterally out of the clip, when it can be turned. As soon as released the spring will pull back into the clip.

When using my improved brake or governor, the springs are adjusted to a tension which will be overcome by the centrifugal force of the shoes when the speed of rotation of the shaft exceeds a certain predetermined rate, and the shoes will then be freed outwardly by the centrifugal force and bear against the stationary rim 4 with a pressure proportioned to the excess of speed above the predetermined rate.

I claim herein as my invention—

A governor for power-shafts having in combination a bearing provided with a laterally-projecting rim, a disk or plate secured to the power-shaft, shoes mounted on the disk or plate and adapted to be forced outwardly against the stationary rim by centrifugal action, springs having their outer ends connected to the shoes, and their inner ends to threaded pins, an internally-threaded sleeve engaging said pins, and an open-sided clip for holding the sleeve as against rotation, substantially as set forth.

In testimony whereof I have hereunto set my hand.

WILLIAM H. McFADDEN.

Witnesses:
DARWIN S. WOLCOTT,
M. S. MURPHY.